United States Patent [19]
Todd et al.

[11] Patent Number: 5,519,554
[45] Date of Patent: May 21, 1996

[54] RACK AND PINION LINEAR SLIDE READ/WRITE HEAD POSITIONING DEVICE

[75] Inventors: Christian A. Todd, Thornton; Donovan M. Janssen, Boulder; Lynn C. Jacobs, Berthoud; Matthew P. Wojciechowski, Louisville, all of Colo.

[73] Assignee: Storage Technology Corporation, Louisville, Colo.

[21] Appl. No.: 343,960

[22] Filed: Nov. 17, 1994

[51] Int. Cl.$^6$ .............................. G11B 5/55; G11B 21/08
[52] U.S. Cl. .................................................. 360/106
[58] Field of Search ...................................... 360/106, 105

[56] References Cited

U.S. PATENT DOCUMENTS

| | | | |
|---|---|---|---|
| 3,024,073 | 3/1962 | Krueger | 384/49 |
| 4,531,788 | 7/1985 | Teramachi | 308/6 |
| 4,598,956 | 7/1986 | Teramachi | 384/45 |
| 4,831,615 | 5/1989 | Goto et al. | 360/106 X |
| 4,880,317 | 11/1989 | Teramachi | 384/45 |
| 5,034,836 | 7/1991 | DeMarti, Jr. et al. | 360/104 |
| 5,179,486 | 1/1993 | Kraemer et al. | 360/106 |
| 5,191,495 | 3/1993 | Takahara | 360/106 |
| 5,201,584 | 4/1993 | Simons | 384/49 |
| 5,280,402 | 1/1994 | Anderson et al. | 360/106 |
| 5,377,052 | 12/1994 | Guzman et al. | 360/106 |
| 5,553,794 | 11/1985 | Teramachi | 308/6 |

OTHER PUBLICATIONS

Feinstein, Alan, *How To Eliminate Retainer Creep*, "Product Design and Development," Sep. 6, 1992.

*Primary Examiner*—John H. Wolff
*Attorney, Agent, or Firm*—Sterne, Kessler, Goldstein & Fox

[57] ABSTRACT

A read/write head positioning device for vertically displacing a magnetic head relative to a tape transport path of a high-performance tape path system, enabling the magnetic head to read and write magnetic data on a plurality of parallel data tracks of a passing magnetic medium which is moving longitudinally on the tape transport path. The device includes a support base assembly fixedly secured in a position proximate to the tape transport path, a carriage assembly adapted to securely receive a magnetic head, and a rack and pinion linear slide bearing unit interposed between the carriage and base to enable the carriage to smoothly and controllably move in the vertical axis relative to the base under the control of an electromagnetic device. The linear slide mechanism includes a rectangular carriage and a base of substantially U-shaped cross-section disposed so as to straddle the carriage. The carriage has longitudinal recesses of rectangular cross-section symmetrically formed on parallel side surfaces. The base has longitudinal recesses formed in opposing inner surfaces of skirt portions in opposing relationship with the longitudinal recesses of the carriage. A pair of bearing rods is respectively interposed in each of the recesses to form a bearing roller surface. On each side of the device is a pair of opposing parallel rack gears, one integral with the base and the other integral with the carriage. These rack gears work in conjunction with each other to communicate with associated pinion gears to enable controlled movement of the carriage relative to the base. The pinions are configured with retaining through holes to freely secure an associated ball bearing. As the bearings travel along the bearing rolling surfaces, the pinions rotate as they travel in the longitudinal direction.

20 Claims, 7 Drawing Sheets

RACK AND PINION LINEAR SLIDE READ/WRITE HEAD POSITIONING DEVICE

CROSS-REFERENCE TO ANOTHER APPLICATION

The following application of common assignee contains some common disclosure with that of the present application: "Rack and Pinion Linear Slide Apparatus," filed concurrently with this application, Ser. No. 08/343,951, filed Nov. 17, 1994, naming as inventors Christian A. Todd, Donovan M. Janssen, and Lynn C. Jacobs. Relevant portions of that application are incorporated into the following detailed description by this and subsequent references.

1. Field of the Invention

This invention relates generally to the field of magnetic tape transport systems, and more particularly, to a read/write head positioning device.

2. Related Art

In the course of developing various systems for the storage of data, data processing systems have traditionally utilized magnetic tape as a data storage medium. Typically, the magnetic tape is contained in an appropriate cartridge to facilitate the handling of the magnetic tape while in use as well as to protect the tape while in storage. An example of such a magnetic tape which has found applications in both the audio recording and computer industries is the dam cartridge form as defined by American National Standard Institute (ANSI) Standard X3.180-1990. This cartridge has a single supply reel of magnetic tape that has a tape leader block attached to the free end of the tape. The IBM Model 3480 tape drive ("IBM" is a registered trademark of International Business Machines Company) utilizes this cartridge. Due to the prevalence of the 3480 tape drive system in the computer and data processing industries, this magnetic tape cartridge has become known in the industry as the 3480-type cartridge.

In common tape drive systems the magnetic tape cartridge in which the magnetic media is enclosed is inserted into a tape transport system. The magnetic tape is then wound and rewound between a supply reel contained within the tape cartridge and a take-up or machine reel in the tape transport system. The tape is transported along a tape path which brings the tape into contact with, or adjacent to, a magnetic tape head located along the tape path. Magnetic tape heads used in present-day tape drive systems are multi-track tape heads having separate read and write elements associated with each data track on the magnetic tape. This enables multi-track magnetic tape heads to read and write several streams of data (one per track) simultaneously. The magnetic tape is typically guided past the read/write head by air bearings which provide an interface of forced air with the magnetic tape to lower friction forces between the tape and bearing surface.

Examples of magnetic tape drive systems which store 18 tracks of data on the half-inch magnetic tape housed in the 3480-type cartridge are the StorageTek 4480 tape drive system, available from Storage Technology Corporation, Louisville, Colo., U.S.A., and the IBM 3480 tape drive system, available from IBM Corporation, Armonk, N.Y., U.S.A. Examples of magnetic tape drives which will store 36 tracks of data on the same half-inch magnetic tape are the StorageTek 4490 tape drive system, manufactured by Storage Technology Corporation; and the IBM 3490 tape drive system, manufactured by IBM Corporation.

Recently, there has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

For example, improvements related to increasing the speed at which the magnetic tape is driven through the tape transport system have been made. Conventional tape drive systems presently move the magnetic tape at approximately 2 meters per second (m/s) while reading and writing data to the tape. Increasing the speed at which the tape travels past the magnetic tape head increases the data transfer rate of the system. This directly increases the speed at which the associated digital computers may operate. Thus, increasing the speed at which a magnetic tape is transported through the system increases the data throughput of the tape transport system by increasing the number of cartridges which may be processed by the tape transport in a given unit of time.

Of particular relevance is the advance in magnetic tape head technology to increase the track density of the magnetic tapes. Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch and track width of a magnetic tape is decreased, thereby increasing track density.

Recently, improvements in the ability of magnetic tapes to store data at higher track densities has exceeded advances in magnetic tape head design. To continue to improve the data throughput of tape transport systems, these incongruous advances have lead to a need to read and write data to high density magnetic tapes, such as a 72 or 144 track half-inch magnetic tape, with a magnetic tape head having a lesser number of read/write elements.

One approach is to move the magnetic tape vertically while maintaining the magnetic head in a stationary position. However, attempts at moving the magnetic tape have been found to cause unrecoverable perturbations in the tape which prevent accurate data transfer, as well as cause excessive wear and damage to the magnetic tape.

Another approach which has been considerably more successful is vertically displacing the magnetic tape head relative to the magnetic tape while maintaining accurate control of the magnetic tape along the tape path. One conventional approach to moving the read/write head has been to mount the read/write head on a leadscrew and, typically using a servo system, adjust the position of the head relative to a passing magnetic tape. This approach is described in U.S. Pat. No. 5,179,486 to Kraemer et al.

However, this and other conventional approaches have been found to be unacceptable for achieving the fine movements necessary to accurately read data from a magnetic tapes having the increased track density described above.

Another problem with conventional tape head positioning devices is the inability to accurately displace the magnetic tape head in one axis without simultaneously causing significant rotation or other positional deviations of the read/write head.

Another problem with conventional tape head positioning devices is their inability to achieve a guiding response rate necessary in high performance tape path systems which transfer data to and from thin film, high-density magnetic tapes tracking at a rate of 4 meters per second and greater.

Another problem with conventional tape head positioning devices is the inability to securely restrain moving cables coupled to the read/write head to prevent high frequency responses from damaging the electrical connections.

What is needed therefore, is a read/write head positioning device capable of accurately and quickly positioning a read/write head for reading and writing data on a high-density, thin film magnetic tape to achieve very high data transfer rates.

SUMMARY OF THE INVENTION

The present invention is a magnetic tape head positioning device for displacing a read/write head in a transverse direction relative to a passing recording medium. The read/write head positioning device is implemented in a tape transport system for reading and writing information on a plurality of parallel tracks of the recording medium which is moving longitudinally on a media transport path of a media transport tape path system.

The read/write head positioning device of the present invention includes a carriage assembly that moves in a vertical axis relative to a support base assembly under the control of an electromagnetic device. The support base is coupled to a tape transport system and remains stationary during the operation of the invention to provide stability and alignment for the carriage assembly. The carriage assembly is connected to a magnet portion of a voice coil and includes a head housing adapted to securely position a read/write head to operate on a plurality of tracks of a passing magnetic tape medium.

The read/write head positioning device of the present invention utilizes a rack and pinion linear slide mechanism to achieve a smooth and accurate positioning of carriage assembly relative to base frame assembly. The support base assembly is composed of a linear slide base portion and a voice coil support portion configured such that the coil portion of the voice coil is positioned beneath the linear slide base portion such that carriage assembly travels in a vertical direction within the U-shaped portion of linear slide base portion while the moving magnet portion travels within the coil portion.

The carriage assembly of the read/write head positioning device of the present invention has a linear slide carriage extending in a longitudinal direction and longitudinal recesses of rectangular cross-section symmetrically formed on parallel side surfaces. The support base assembly includes a linear slide base of substantially U-shaped cross-section disposed as to straddle the carriage. The linear slide base has longitudinal recesses formed in the opposing inner surfaces of skirt portions thereof in opposing relationship with longitudinal recesses of the carriage. A pair of bearing rods are respectively interposed in each of the recesses. The bearing rods are in opposing relationship and cooperate with each other to form a bearing roller surface. The bearing rods in each bearing rod pair are separated by a distance less than the diameter of the ball bearing. In addition, opposing and adjacent bearing rods of opposing bearing rod pairs also form a bearing roller surface. Thus, each bearing rod contributes to the formation of two bearing roller surfaces.

On each side of the read/write head positioning device is a pair of opposing rack gears, one integral with the support base assembly and the other integral with the carriage assembly. Each rack gear in the base is substantially parallel with and opposed to a corresponding rack gear in the carriage. On one side of each rack gear that faces the opposing rack gear are a series of gear teeth which extend along the length of the rack gear in the longitudinal direction. These rack gears work in conjunction with each other to communicate with associated pinion gears to enable controlled movement of the carriage relative to the base.

The pinions are configured with retaining through holes adapted to freely secure an associated ball bearing. Each pinion contains gear teeth on the circular perimeter for communicating with rack gear teeth of the associated pair of rack gears. The pinions have a diameter such that the pinion gear teeth simultaneously mesh with the rack gear teeth of both rack gears of corresponding rack gear pair. As the bearings travel along the bearing rolling surfaces created by bearing the bearing rods, the pinions rotate as they travel in the longitudinal direction.

A preload plate is positioned in one recess of the linear slide base to apply an even pressure on the bearing rods, pinions, and bearings. This applied pressure secures bearing rods against a reference edge on the inner wall of the opposing skin portion of the carriage.

The read/write head positioning device of the present invention is implemented as one component of a high performance media transport system. In the preferred embodiment of the present invention, the record medium is a magnetic medium, the media is a magnetic tape, and the information is digital data. In this embodiment, the media transport system is a high performance tape path system. The high performance tape path system is comprised of a number of media guidance devices which provide varying levels of control and guidance to the tape magnetic tape as it travels along a tape path between a supply reel and a take-up reel. The tape path has a magnetic tape head and the read/write head positioning queue of the present invention located at a central position. On each side of the magnetic tape head are fine tape guidance devices which provide precise and accurate control of the magnetic tape. Adjacent to each of the fine tape guidance devices along the tape path are tape cleaner block assemblies which are used to clean the tape as it approaches and departs the area of the tape head. Adjacent to each of the tape cleaner block assemblies are coarse tape guidance devices which provide the initial control and guidance of the magnetic tape.

One advantage of the present invention is the ability to allow the magnetic tape head to move in a linear fashion without causing undesirable deviations, such as rotation, tilt, or skew.

Another advantage of the present invention is its compact design, enabling the present invention to be easily integrated into various form factor tape transport systems.

Another advantage of the present invention is that it can be used in either an open loop or closed loop approach, with or without an encoder.

Another advantage of the present invention is the utilization of a rack and pinion arrangement. This prevents the carriage ball retainer and base from moving relative to each other under gravitational, vibrational, or other forces, or due to misalignment of the bearing rods. In addition, this prevents bearing creep from adversely reducing the range of movement of the device or causing other operational impairments.

Another advantage of the present invention is its ability to provide skew adjustment capability, enabling quick alignment of the read/write head with the passing recording medium.

Another advantage of the present invention is its ability to provide mounting and strain relief features for the flex cables, thereby enabling the present invention to operate at high frequencies for extended periods of time without the associated vibrations from causing a degradation of the connection between the flex cable and read/write head.

Another advantage of the present invention is its ability to position the read/write had at a rate of 60 Hz. This response time enables the present invention to be used in high performance tape path systems wherein the recording medium travels at extremely high rates.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawings in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

I. Introduction

The read/write head positioning device of the present invention is a device for positioning a read/write head, at different vertical positions relative to a recording medium passing in a horizontal and transverse direction to the read/write head. The head positioning device includes a base assembly fixedly secured to a media path assembly of a transport system. A carriage assembly is movably secured to the base assembly via a linear slide, allowing the carriage assembly to travel in a vertical direction constrained by a rack and pinion mechanism and driven by a remotely controlled voice coil.

II. Read/Write Head Positioning Device

Figure 1:
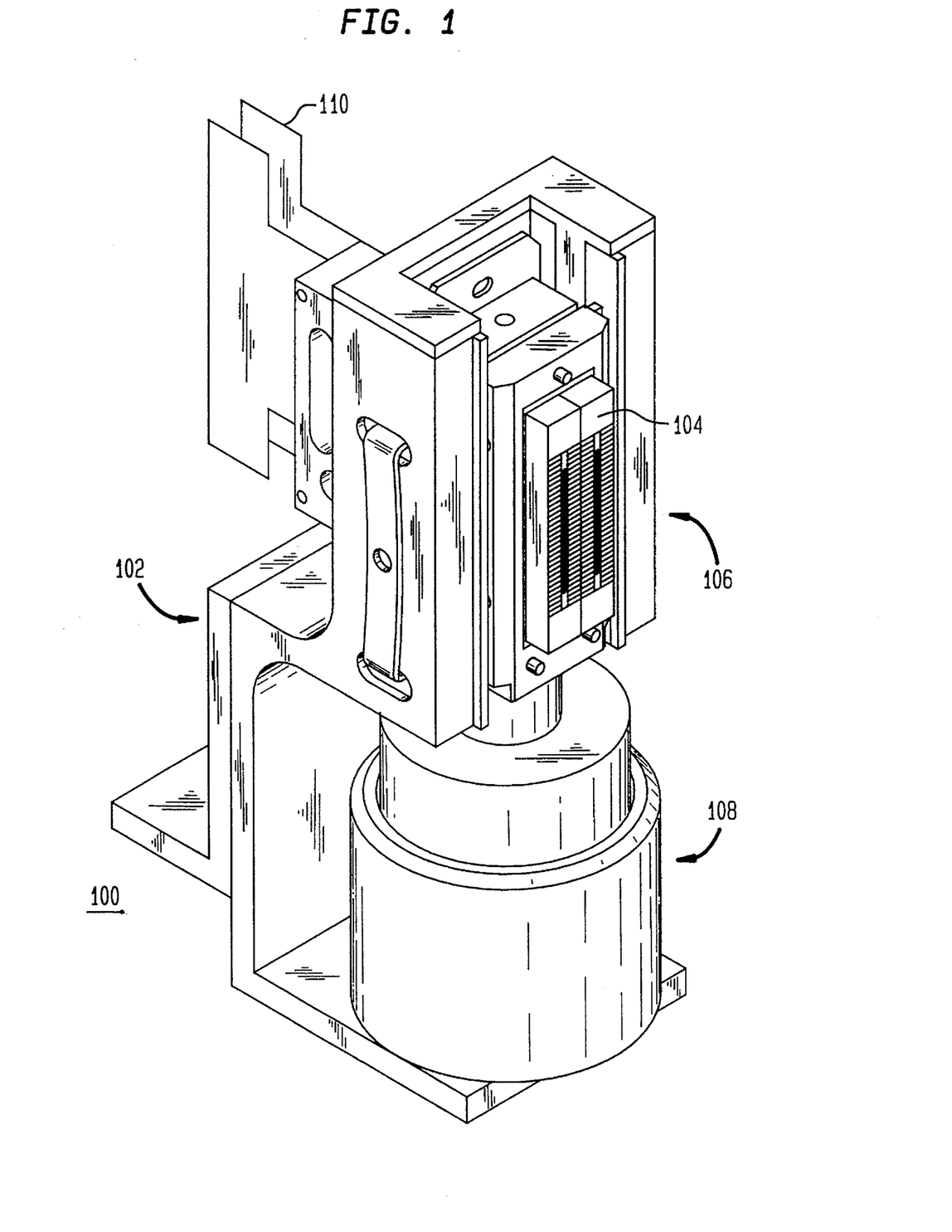
FIG. 1 is an isometric view of the read/write head positioning device.
Figure 2:
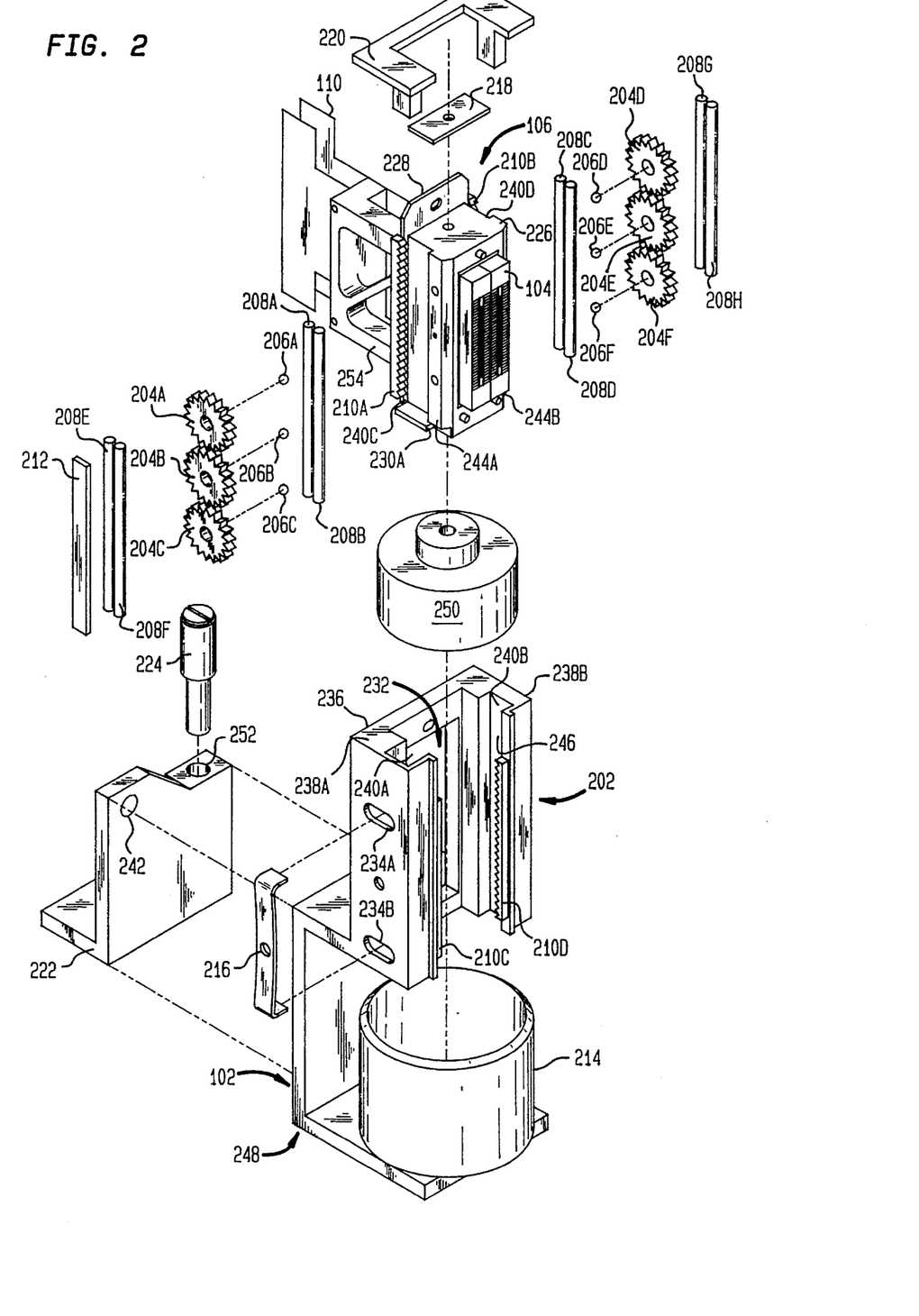
FIG. 2 is an exploded view of the read/write head positioning device.

FIG. 1 is a perspective view of the preferred embodiment of the read/write head positioning device 100 of the present invention. FIG. 2 is an exploded view read/write head positioning device 100. Referring now to FIGS. 1 and 2, head positioning device 100 is shown with a read/write tape head 104 and associated flex circuits 110 installed. As will be described in detail below, head positioning device 100 is configured to be installed in a tape transport system.

The read/write head positioning device 100 includes a carriage assembly 106 and a support base assembly 102 (also referred to as base frame assembly 102 or simply base 102). Carriage assembly 106 moves in a vertical axis relative to a base assembly 102 under the control of a voice coil 108. Support base 102 is coupled to a tape transport system and remains stationary during the operation of the invention. Support base assembly 102 provides stability and alignment for carriage assembly 106 and supports voice coil actuator 108.

Coupled to carriage assembly 106 is a head housing 226 adapted to receive read/write head 104 and to fixedly secure read/write head 104 in a position to operate on a plurality of tracks of a passing magnetic tape medium (discussed below). Head housing 226 is attached to a moving magnet portion 250 of voice coil 108 and is movable in the vertical direction with carriage assembly 106 under the control of a voice coil 108.

Referring to FIG. 2, the voice coil 108 includes two main components: a magnet portion 250 and a coil portion 214. Voice coil 108 responds to electrical input signals to drive carriage assembly 106 to a predetermined position. The control of a voice coil such as voice coil 108 is considered to be well known to one of ordinary skill in the relevant art. For reasons discussed below, in the preferred embodiment of the present invention, the means for positioning carriage assembly 102 is a voice coil actuator, as one skilled in the relevant art would find apparent, other types of electromagnetic devices may be used. In addition, piezoelectric devices may also be used in lieu of voice coil 108. In addition, read/write head positioning device 100 and voice coil 108 may be operated in any well known configuration, such as in an open loop or closed loop configuration, with or without an encoder.

Figure 3:
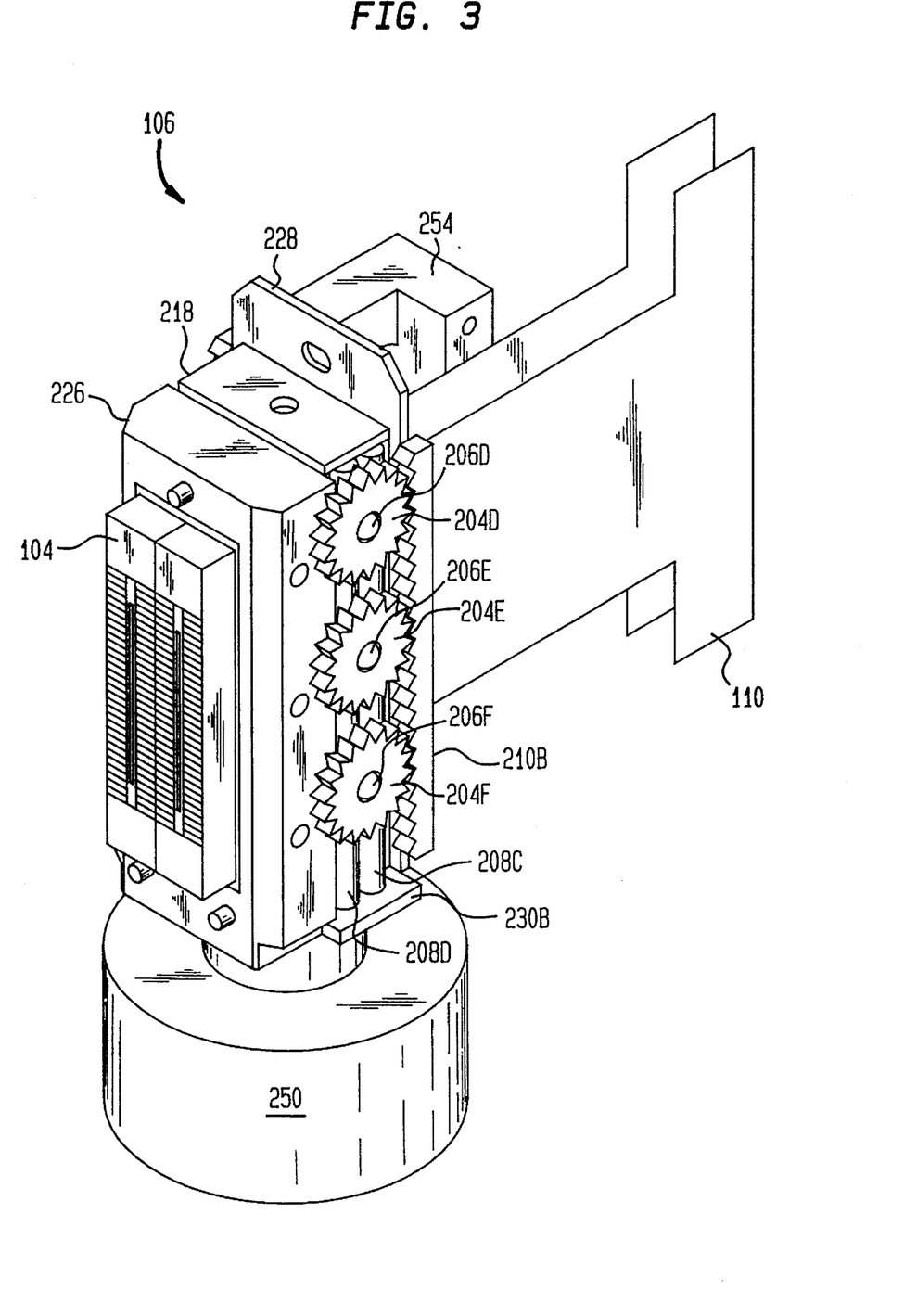
FIG. 3 is an isometric of the carriage assembly.
Figure 4:
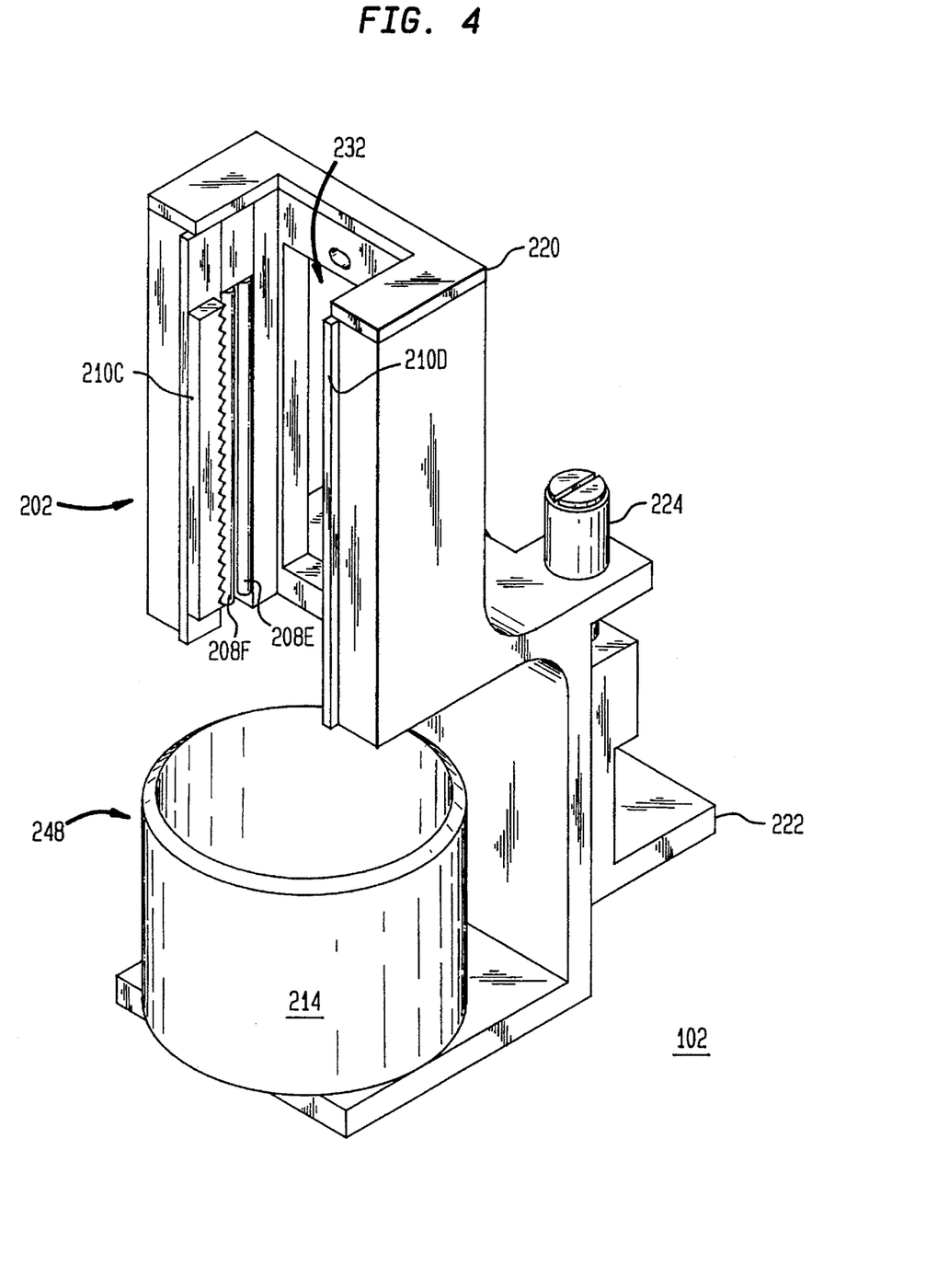
FIG. 4 is an isometric of the base assembly.
Figure 5:
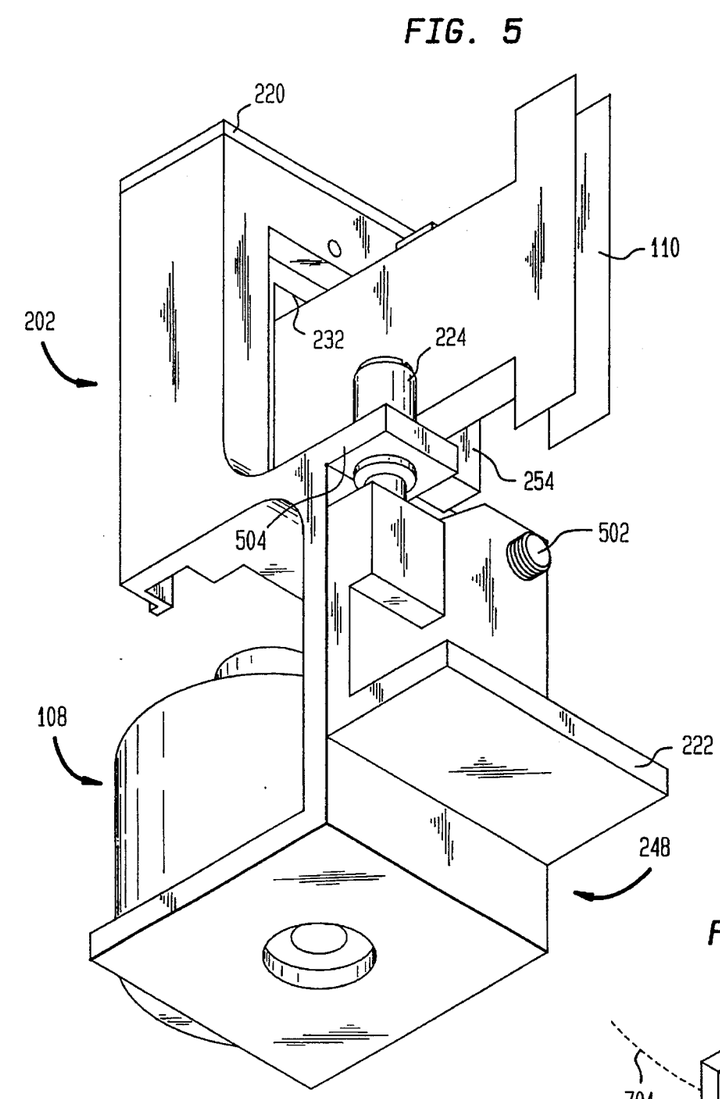
FIG. 5 is a rear perspective view of the read/write head positioning device.

FIG. 3 is a perspective view of carriage assembly 106. FIG. 4 is a perspective view of support base assembly 102. FIG. 5 is a rear perspective view of the rack and pinion linear slide read/write head positioning device in the fully assembled condition. Referring to FIGS. 1–5, further details of the preferred embodiment of the read/write head positioning device 100 of the present invention are now described.

Referring to FIGS. 2 and 3, carriage assembly 106 is now described. As shown in FIG. 3, carriage assembly 106 is connected to magnet portion 250 of voice coil 108. In addition, FIG. 3 illustrates the operational relationship between the rack and pinion linear slide components of the present invention and carriage assembly 106. These will be discussed in detail below.

As discussed above, carriage assembly 106 is adapted to receive and securely align magnetic head 104. Magnetic head 104 is electrically coupled to the tape transport system via flex circuits 110. As will be described in detail below, flex circuits 110 are secured to carriage assembly 106 by a flex strain relief 254. Flex strain relief 254 is coupled to head housing 226 via head housing back plate 228.

Referring to FIGS. 2 and 4, support base assembly 102 is now discussed. Support base assembly 102 is composed of two main portions: linear slide base portion 202 and voice coil support portion 248. As shown in FIG. 4, voice coil support portion 248 is configured such that coil portion 214 of voice coil 108 is positioned beneath linear slide base portion 202. This relative positioning enables that carriage assembly 106 to travel in a vertical direction within the U-shaped portion of linear slide base portion 202 while moving magnet portion 250 travels within coil portion 214. As described above, support base assembly 102 is fixedly attached to a tape transport system during the operation of the present invention. Base frame assembly 102 provides a rigid external structure necessary to maintain the proper alignment of magnetic head 104 during the operation of the read/write head positioning device.

The read/write head positioning device of the present invention utilizes a rack and pinion linear slide mechanism to achieve a smooth and accurate positioning of carriage assembly 106 relative to base frame assembly 102. The components of the rack and pinion linear slide mechanism portion of the present invention are now described below with reference to FIGS. 1–5.

In the preferred embodiment, a head housing 226 performs a second function, operating as a linear slide carriage. Thus, head housing 226 shall also be referred to as linear slide carriage, depending on the functionality being discussed. Linear slide carriage 226 extends in a longitudinally vertical direction. Linear slide carriage 226 has substantially parallel sides 244A (left) and 244B (right) on opposite sides of head housing/carriage 226. Linear slide carriage 226 has longitudinal recesses 240C and 240D of rectangular cross-section symmetrically formed on both side surfaces, 244A and 244B and are substantially parallel with the longitudinal axis.

Support base assembly 102 includes a linear slide base portion 202. Linear slide base portion 202 is of substantially U-shaped cross-section and is disposed as to straddle linear slide carriage 226. Linear slide base portion 202 has longitudinal recesses 240A and 240B formed in the opposing inner surfaces of skirt portions 238A and 238B, respectively.

Linear slide base recesses 240A and 240B are substantially parallel with and juxtaposed to carriage recesses 240C and 240D, respectively. Longitudinal recesses 240A, 240B, 240C, and 240D are collectively and generally referred to as recesses 240.

A pair of bearing rods are respectively interposed in each of longitudinal recesses 240. Specifically, bearing rods 208A and 208B are interposed in carriage recess 240C, bearing rods 208C and 208D are interposed in carriage recess 240D, bearing rods 208E and 208F are interposed in base recess 240A, and bearing rods 208G and 208H are interposed in base recess 240B. The bearing rods of each pair of bearing rods are in opposing relationship and cooperate with each other to form a bearing roller surface. The surface of each bearing rod in a bearing rod pair is at a distance less than at least a diameter of each ball bearing from the surface of the other bearing rod of the bearing rod pair.

Bearing rods 208A and 208B located in carriage recess 240C are substantially parallel and in opposing relationship with corresponding bearing rods 208E and 208F located in corresponding recess 240A of skirt portion 238A of linear slide base portion 202. Likewise, bearing rods 208C and 208D in carriage recess 240D are substantially parallel and in opposing relationship with bearing rods 208G and 208H in corresponding recess 240B of skirt portion 238B of linear slide base portion 202. The positional relationship between adjacent bearing rods located in carriage and base recesses 240 is similar to the positional relationship between bearing rods located in the same recess. Thus, opposing and adjacent bearing rods also form a bearing roller surface. Therefore, each corresponding bearing rods pair together form four bearing roller surfaces. Bearing rods 208A–208D are collectively and generally referred to as bearing rods 208.

Ball bearings 206A, 206B, and 206C are in contact with the corresponding bearing roller surfaces created by bearing rods 208A, 208B, 208E, and 208F. Likewise, ball bearings 206D, 206E, and 206F are in contact with the corresponding bearing roller surfaces created by bearing rods 208C, 208D, 208G, and 208H. By providing four bearing rods spaced equally from each other at a distance less that the diameter of ball bearings 206, the linear slide mechanism portion of the present invention enables the carriage assembly 106 to be positioned in the vertical position.

As discussed above, bearing rods 208 are interposed in longitudinal recesses 240. In the preferred embodiment of the present invention, bearing rods 208 are forced into parallel alignment along the longitudinal axis under the pressure of a preload plate 212. Preload plate 212 retains bearing rods 208 against a reference wall 246 on the inner surface of recess 240B in skirt portion 238B of linear slide base portion 202. Preload plate 2 12 is secured against bearing rods 208 by a preload plate clip 216. Preload plate clip 216 couples to skirt portion 238A of linear slide portion 202. Preload plate clip 216 has curved ends which are configured to pass through access holes 234A and 234B of skirt portion 238A to contact preload plate 212. Other means for securing bearing rods into position may be used. However, the bearing rods must be have enough positional tolerance in directions orthogonal to the longitudinal direction to enable them to be positioned in a substantially parallel position along the longitudinal axis.

Preload plate 212 is positioned in recess 240A of base 202. Recess 240A in skirt 238A has a greater depth than recess 240B of skin portion 238B of base 202. This larger recess is to accommodate preload plate 212. This applied pressure secures bearing rods 110 against a reference wall 248 on the inner wall of opposing skirt portion 238B. Preload plate 212 is of a material of sufficient rigidity to transfer the applied pressure equally to the length of bearing rods 208. Alternative securing means may include an expandable rubber, polymer, or plastic which is compressed and inserted into recess 240A during assembly and then, upon release, expands to preload the linear slide bearing.

The rack and pinion features of the present invention are now discussed. Generally, on each side of read/write head positioning device 100 is a pair of opposing rack gears. One rack gear of each pair of opposing rack gears is integral with linear slide base portion 202 of support base assembly 102. The other rack gear is integral with linear slide carriage/head housing 106.

More specifically, one pair of rack gears is comprised of rack gear 210A and rack gear 210C. Rack gear 210A is substantially parallel with and opposed to corresponding rack gear 210C. Rack gear 210C is disposed on the inner surface of skirt 238A adjacent to and parallel with longitudinal recess 240A. Rack gear 210A is disposed on the surface of side 244A of linear slide carriage 226. Rack gear 210A is adjacent to and parallel with longitudinal recess 240C.

Likewise, the other pair of opposing rack gears are disposed on the opposite side of read/write head positioning device 100. This pair of opposing rack gears includes rack gear 210B and rack gear 210D. Rack gear 210B is substantially parallel with and opposed to corresponding rack gear 210D. Rack gear 210D is disposed on the inner surface of skirt 238B adjacent to and parallel with longitudinal recess 240B. Rack gear 210B is disposed on the surface of side 244B of linear slide carriage 106. Rack gear 210B is adjacent to and parallel with longitudinal recess 240D. Racks 240A, 240B, 240C, and 240D are collectively and generally referred to as racks 240.

On one side of each rack gear that faces the opposing rack gear are a series of gear teeth which extend along the length of the rack gear in the longitudinal direction. As will be discussed below, these rack gears work in conjunction with each other to communicate with associated pinion gears to enable controlled movement of carriage assembly 106 relative to linear slide base portion 202.

Pinions 204A, 204B, and 204C are configured with retaining through holes configured to freely secure associated ball bearings 206A, 206B, and 206C, respectively. Likewise, pinions 204D, 204E, and 204F are configured with retaining through holes for freely securing associated ball bearings 206D, 206E, and 206F, respectively. Pinions 204A–204F are collectively and generally referred to as pinions 204. Ball bearings 206A–206F are collectively and generally referred to as ball bearings 206, or simply bearings 206.

Each of pinions 204 contains gear teeth on the circular perimeter for communicating with rack gear teeth of the associated pair of rack gears. Pinions 204 have a diameter such that the pinion gear teeth simultaneously mesh with the rack gear teeth of both rack gears of corresponding rack gear pair. Thus, referring to FIG. 3, as bearings 206D, 206E, and 206F travel along the bearing rolling surface created by bearing rods 208C and 208D, pinions 204D, 204E, and 204F also travel in the longitudinal direction, rotating due to the pinion gear teeth communicating with gear teeth of rack 210B. This same communicating relationship exists between pinions 204D, 204E, and 204F and corresponding rack gear 210D (shown in FIGS. 2 and 4).

As discussed above racks 210 are integral with linear slide base portion 202 and linear slide carriage 106. However, as one skilled in the relevant art would find apparent, racks 210 may be separately manufactured and secured to the carriage and base in any known manner.

The preferred embodiment of the present invention utilizes the above rack and pinion features in the linear slide mechanism portion to overcome the problems of bearing migration (also referred to as bearing creep). Bearing migration or creep negatively affects the performance of many types of linear slide bearings. Bearing creep may be due to misalignment of the tracks or uneven load pressure on the ball bearings. Under such conditions, the ball bearings will creep towards a position which has the least load. The problem of bearing creep is exacerbated by the vertical application of the linear slide portion of the present invention. When positioned vertically, the force of gravity directly acts on the bearings causing them to migrate to the lower end. This gravitational effect on vertical orientation is coupled with a vibration component due to the high frequency response of the voice coil, thereby accelerating bearing creep.

In the preferred embodiment of the present invention, the linear slide carriage 226 travels relative to the linear slide base 202. As discussed above, linear slide carriage 226 is one component of carriage assembly 106. Carriage assembly 106 is comprised of a minimum number of components in order to reduce the mass of the moving components of device 100. This allows read/write head positioning device 100 to respond quickly to control inputs. In addition, this approach minimizes the inertia force produced when the present invention moves. In the present application wherein such a high frequency response is required, the preferred embodiment of the driver is a voice coil actuator. Such devices are capable of having a high frequency response to rapid changes in input electrical control signals.

In addition to reducing the mass of carriage assembly 106, the coil portion 214 of voice coil actuator 108 is coupled to the voice coil support portion 248 of base frame assembly 102. Thus, the magnet portion 250 of voice coil actuator 108 is the movable portion of voice coil actuator 108. Moving magnet portion 250 has substantially less mass than coil portion 214. Thus, the combined mass of carriage assembly 106 and moving magnet portion 250 is sufficiently low such that voice coil actuator 108 can position carriage assembly 106 at a rate of 60 Hz or more.

Further description of the rack and pinion linear slide features of the present invention may be found in "Rack and Pinion Linear Slide Apparatus," filed concurrently with this application, 1411.0640000, Ser. No. 08/343,951filed Nov. 17, 1994, naming as inventors Christian A. Todd, Donovan M. Janssen, and Lynn C. Jacobs, incorporated herein by reference in its entirety.

Figure 6:
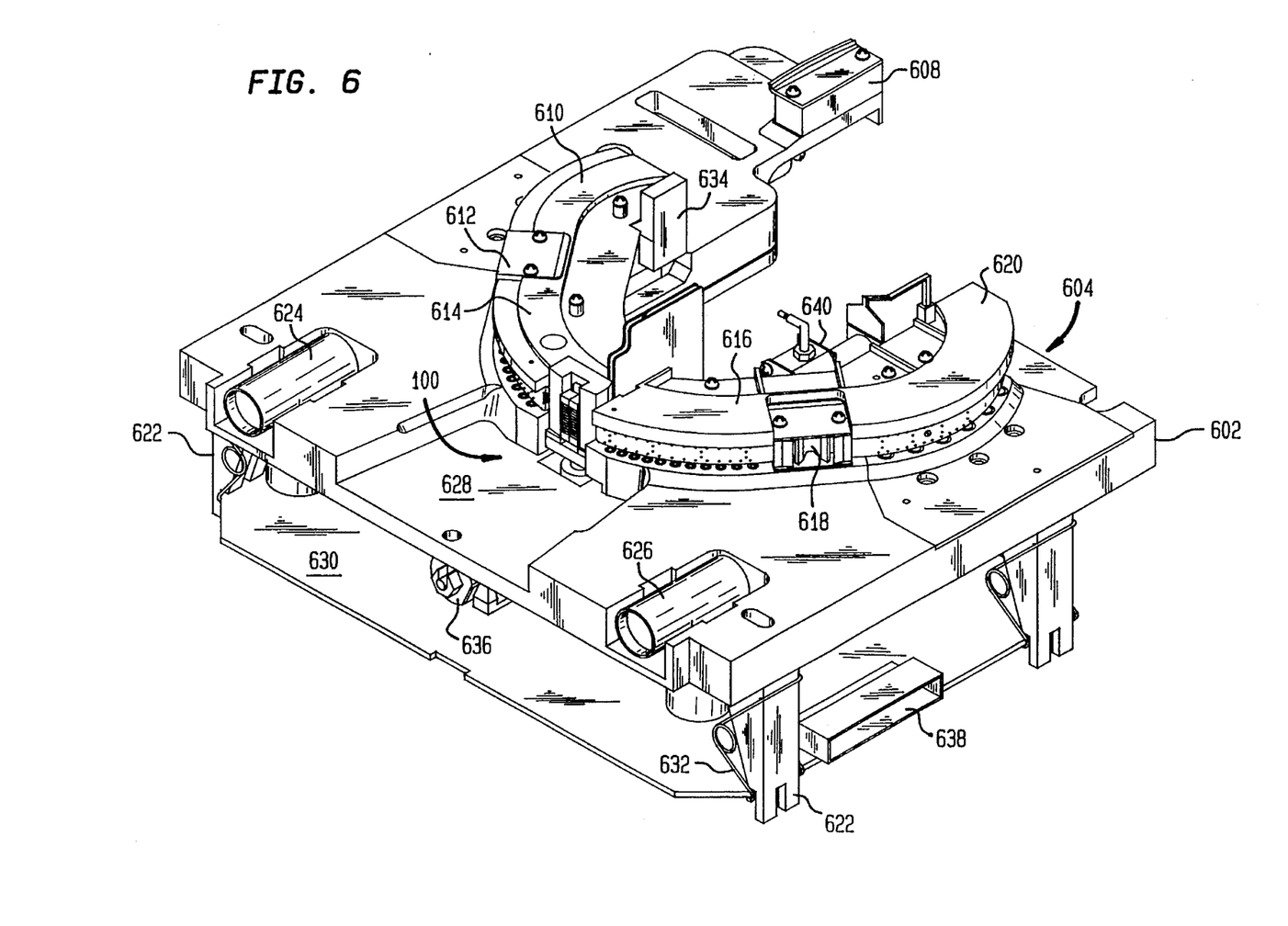
FIG. 6 is an isometric view of a high performance tape path system of comprising the read/write head positioning device of the present invention.
Figure 7:
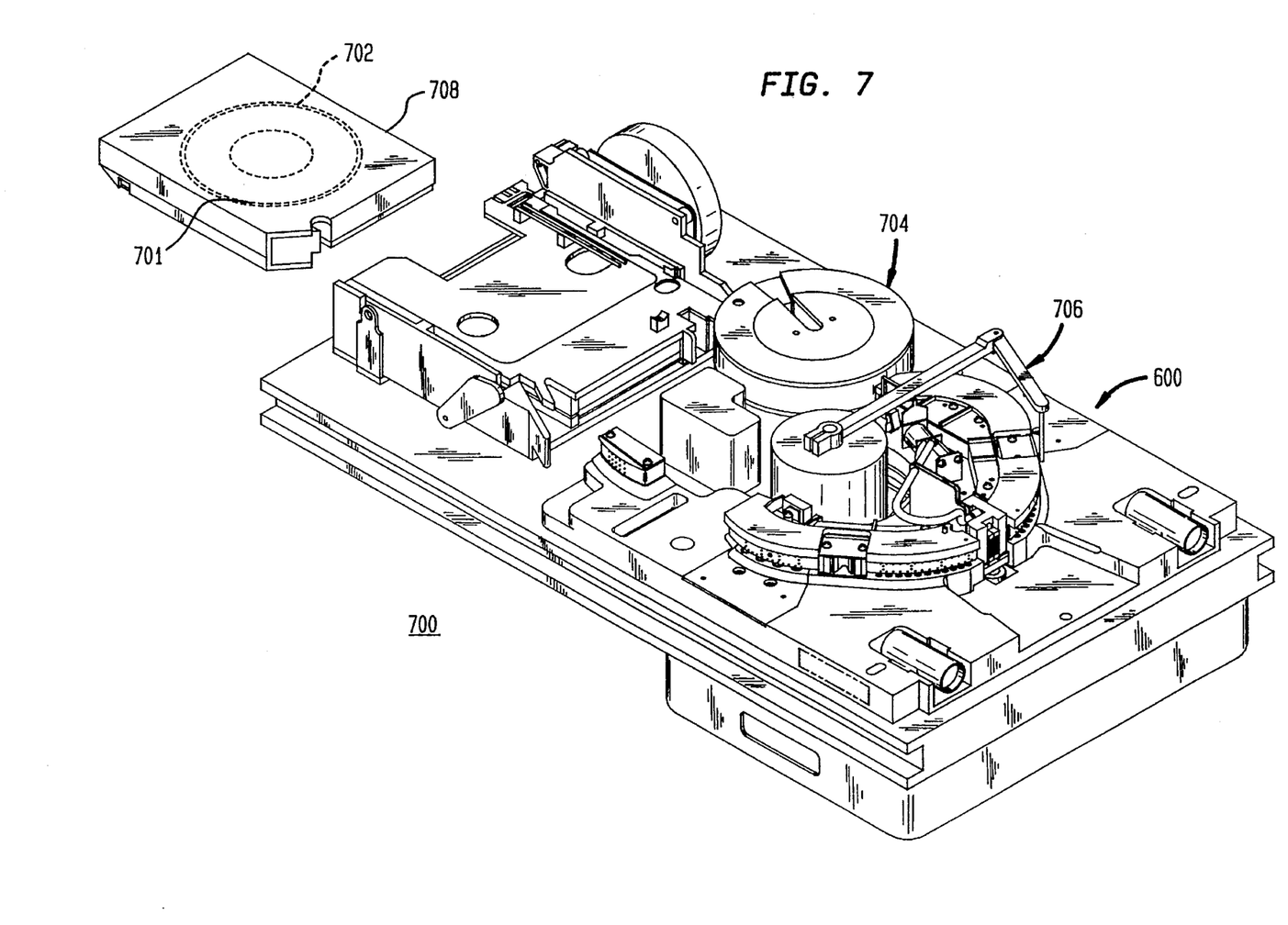
FIG. 7 is a perspective view of a tape transport system main deck illustrating the location of the major components, including a high performance tape path system having the read/write head positioning device of the present invention.
Figure 8:
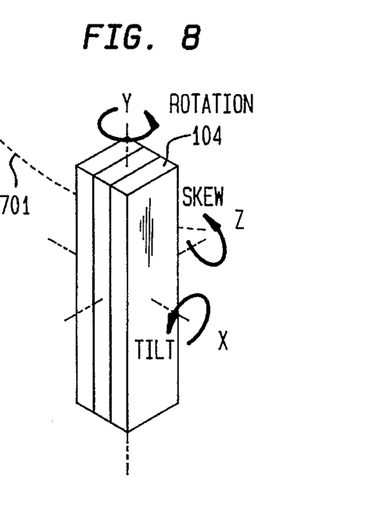
FIG. 8 is a perspective view of the magnetic tape head illustrating the axes of rotation about which the tape head may rotate.

FIG. 6 is a perspective view of a high-performance tape path system wherein the rack and pinion linear slide read/ write head positioning device of the present invention is implemented. FIG. 7 is a perspective view of a tape transport system main deck illustrating the location of the high-performance tape path system 600 as well as other major components of a tape transport system. FIG. 8 is a perspective view of a magnetic tape head illustrating the axes of rotation about which the magnetic tape head may rotate.

Magnetic head 104 is secured within head housing 226. Magnetic head 104 is electrically connected to a read/write pre-amplification card (discussed below) through magnetic tape head cable assembly 110. Cable assembly 110 is referred to as flex circuit 110. This is because it is actually part of magnetic head assembly 104. To prevent the coupling of flex circuit 110 to magnetic head 104 from being damaged due to the movement of head housing 226, a strain relief 254 is attached to the rear face of head housing 226. Strain relief 254 supports flex circuit 110 and transfers the vertical forces to the body of the flex circuit.

Magnetic tape head 104 receives pneumatic pressure from a pneumatic source through a tape lifter valve 640 to lift a passing magnetic tape 701 away frown magnetic tape head 104 when the magnetic tape is stopped or is being fast-forwarded or rewound from a take-up reel 704 back to a supply reel 702. The tape lifter valve 640 controls the pneumatic pressure which is applied to the magnetic tape through the magnetic tape head 104 to control tape flight over magnetic tape head 104. The tape lifter valve 640 is pneumatically coupled to the magnetic tape head assembly 104 through a tape lifter valve pneumatic fitting integral with strain relief 254.

FIG. 8 is a perspective view of magnetic tape head 104 illustrating the axes of rotation about which the tape head may rotate. The configuration of the present invention prevents undesirable tilting (rotation about the X axis), skew (rotation about the Z axis), or wrap (rotation about the Y axis). The magnetic head may be positioned along the Z axis, referred to as penetration; and Y axis, referred to as tracking. The magnetic tape head does not translate along the X axis.

There are a number of guiding accuracy tolerances which must be set before and during assembly of read/write head positioning device 100 and its installation into the high performance tape path system.

In the preferred embodiment of the present invention, the first tolerance-setting step adjusts the tolerance of rotation about the X axis (tilt). The tilt tolerance is set during the assembly of read/write head 104 and head housing 226. This angle must be held within 0.001 inches to the tape reference edge after the head housing is installed in read/write head positioning device and secured to the tape path system.

The second tolerance-setting step is the positioning of read/write head 104 along the Y axis (tracking). In stationary read/write head configurations, this is a fixed dimension from the tape reference edge to the first track on the read/write head. This dimension is usually set within a tolerance of ±0.0004 inches. Since the present invention vertically positions read/write head 104, this tolerance is not critical in the present invention.

The third tolerance-setting step is the rotational positioning of the read/write head about the Y axis (wrap angle). This adjustment affects two orientations; wrap angle and penetration (position along the Z axis). For stationary magnetic tape heads, the wrap angle tolerance must be held within 5 arc-minutes.

The fourth tolerance-setting step is the rotational positioning of the read/write head about the Z axis (skew). This angle must be held within 0.5 arc-minutes over the length of the head. Skew is particularly sensitive to positional movements of read/write head 104. Thus, the present invention provides the ability to easily and quickly adjust the skew of the device. To adjust the skew of magnetic tape head 104, a skew adjust screw 224 is used to rotate base assembly 102 relative to adjustment bracket 222 about a pivot point located at screw 502. Skew adjust screw 224 is a dual-thread screw with one diameter thread coupled to a horizontal portion 504 of base assembly 102. Skew adjust screw 224 includes a thread having a second diameter configured to cooperate with tapped hole 252 in adjustment bracket 222. By rotating skew adjust screw 224, base assembly 102 rotates about screw 502, thereby adjusting the skew of base assembly 102 and thus magnetic head 104. The operation of a dual-thread skew adjust screw is considered to be well-known to one of ordinary skill in the relevant art.

In the preferred embodiment of the present invention, magnetic head 104 is an 18 track magnetic head, positioned adjacent to the center of a passing 144 track half-inch magnetic tape. The track pitch of a 144 track tape is approximately 0.0031 inches. Thus, the 18 track head is moved a total of 8 times for a total of 144 tracks. Since the tracks are on a 0.0031 inch pitch, the resulting motion is 0.0124 inches up and 0.0124 inches down. However, as one skilled in the relevant art would find apparent, read/write head 104 may be any size, such as a 1, 2, 4, 36, 72, and 144 track read/write head. Equally apparent is that the data storage medium may contain any number of tracks, such as 18, 36, 72, 144, or more data tracks.

Although the read/write head is driven through a range of motion of 0.0248 inches in the preferred embodiment discussed above, the read/write head positioning device of the present invention has been configured to achieve a 0.375 inch range of movement. This range of motion is the maximum vertical range of motion through which read/write head 104 may travel while staying within the confines of the present configuration of the High Performance Tape Path system. Although not necessary for the preferred application described above, the 0.375 inch stroke enables the read/write head positioning device of the present invention to accommodate lower performance drives, such as those having fewer read/write elements on the read/write head.

However, when read/write head 104 is positioned through a given range of vertical motion, it has an apparent length relative to a passing medium which is the summation of its actual length and the range of motion. For example, read/write head is 0.500 inches in length. When driven through the above 0.375 inch range of motion, it has an apparent length of 0.875 inches.

The guiding accuracy tolerances discussed above for a fixed read/write head are applicable throughout this apparent length of 0.875 inches. That is, the guiding accuracy tolerances must be maintained throughout the entire range of motion of the positioned read/write head. Since read/write head positioning device 100 operates within certain tolerances, as the range of motion and apparent length of the head increase, there is a proportional reduction in the allowable tolerances. That is, as the range of motion increases, the guiding accuracy tolerances must be held within a narrower range to achieve the above stationary head tolerances throughout the entire range of motion. The implementation of a linear slide mechanism in the preferred embodiment of the present invention enables read/write head positioning device 100 to dynamically and accurately position read/write head 104 within these tolerances.

Once the above guiding accuracy tolerances, are set, and read/write head positioning device 100 is installed in a tape path system, read/write head positioning device 100 operates in conjunction with the tape path system to accurately align read/write head 104 with the data tracks of a passing medium. Thus, the tape path system in which the read/write head positioning device is installed is required to maintain certain tape edge guidance tolerances. In fixed read/write head systems, these tape edge guidance tolerances are more stringent than in tape path systems which implement the read/write head positioning device of the present invention.

For example, in the configuration described above, the tape path system must be capable of positioning the tape within ±0.00025 inches of the tape reference edge to properly transfer data between a stationary read/write head and a passing data tracks. Since read/write head positioning device 100 positions read/write head 104 according to the relative position with a servo track on the passing medium which the head is following, the strict tolerances for tape positioning are no longer required. In fact, the positional tolerance of a tape path system in which the read/write head positioning device 100 is implemented is ±0.0075 inches, thirty times greater that the tolerance for systems implementing stationary read/write heads. This will significantly simplify future tape paths. In the preferred embodiment of the present invention, the positional accuracy tolerance of read/write head 104 relative to the data tracks is the result of extensive empirical studies in track overlap, servo guiding capabilities, tape speeds, read/write element widths, read/write currents, etc. The inventors arrived at a tracking accuracy tolerance of ±0.0002 inches. However, as one skilled in the relevant art would find apparent, other tracking accuracy tolerances are possible depending upon the application.

III. Tape Path System Architecture

FIG. 6 illustrates a top perspective view of a high performance tape path system 600 in which the read/write head of the present invention is implemented. Referring now to FIG. 6, the major components of tape path system 600 are now discussed. All components relating to high performance tape path system 600 are integral with, mounted on, or attached to, a read/write sub-deck 602. Mechanically coupled to sub-deck 602 via support columns 622 is a read/write pre-amplification card 630 which is electrically connected to the components on sub-deck 602.

In the preferred embodiment, there are eight major components of tape path system 600 which guide and control the magnetic tape as it travels along a tape path 604. Following tape path 604, the first component of tape path system 600 that the magnetic tape interfaces with is an initial tape guidance device 608. The magnetic tape then continues to travel along tape path 604 until it comes under the control of a coarse tape guidance device 610. The magnetic tape is then cleaned by a tape cleaner assembly 612. Lastly, the magnetic tape passes a fine tape guidance device 614. Coarse tape guidance device 610 and fine tape guidance device 614 provide increasing control over the movement of the magnetic tape as it travels along tape transport path 604 from a supply reel 704 to the magnetic tape head 104 located in read/write head positioning device 100. This enables tape path system 600 to achieve the necessary accuracy of tape movement control of the magnetic tape as it passes over magnetic tape head 104.

Components which are functionally similar to coarse tape guidance device 610, tape cleaner assembly 612, and fine tape guidance device 614 are located on the opposite side of magnetic tape head 104. These include a fine tape guidance device 616, a tape cleaner assembly 618, and a coarse tape guidance device 620. This side of tape path system 600 is referred to as the take-up reel side since the magnetic tape is transferred between a take-up reel 704 and magnetic tape head 104. The opposite side of tape path system 600 is referred to as the supply reel side since the magnetic tape is transferred between a supply reel 702 located within a magnetic tape cartridge 708 and magnetic tape head 104. This mirror image configuration of components on the supply reel and take-up reel sides enables tape path system 600 to optimally transfer data between magnetic head 104 and magnetic tape medium 701 when magnetic tape medium 701 travels in both directions.

In the high performance tape path system 600 of the present invention, the magnetic tape is primarily controlled by the five tape guidance devices introduced above: initial tape guidance device 608, coarse tape guidance device 610, fine tape guidance device 614, fine tape guidance device 616, and coarse tape guidance device 620. These tape guidance devices have different configurations and perform different functions to control the movement of the magnetic tape as it travels through high performance tape path system 600. These different configurations and functions are dependent upon the location of the tape guidance device along the tape path in high performance tape path system 600. All five tape guidance devices contain air bearings which provide a cushion of air on which the magnetic tape travels.

The read/write sub-deck 602 has raised platforms 622 on which the above pneumatic tape guidance devices are mounted. The pneumatic tape guidance devices receive pneumatic pressure and/or vacuum from pneumatic source(s) through a pneumatic distribution system (not shown). This pneumatic pressure/vacuum is fed through the bottom surface of read/write sub-deck 602 to supply ports 624 and 626 on the top surface of the sub-deck 602 on an associated raised platform.

Referring to FIG. 6, fine tape guidance devices 614 and 618 are positioned on each side of read/write head positioning device 100. These fine tape guidance devices accurately guide and control the magnetic tape to prevent lateral movement of the magnetic tape as it passes magnetic tape head 104. This enables high performance tape path system 600 to support read/write head positing device with an 18 track tape head capable of writing data to a magnetic tape having a track density of 144 data tracks per half-inch tape.

A tape tension transducer 634 is coupled to coarse tape guidance device 610. The use of a pressure transducer to determine tape tension in a tape transport system is well known in the art. Typically, the magnetic tape is passed around an arcuate surface defined by an air bearing which provides a gaseous cushion between the magnetic tape and the arcuate surface. Air is typically used to create the gaseous cushion, however, any other type of gaseous material suitable for a given application may be used. The tape tension transducer is coupled to a sense port to determine the pressure between the magnetic tape and any air-bearing arcuate surface. Since the tape tension is directly proportional to the pressure measured at the sense port, the tension of the magnetic tape can be readily determined.

Read/write preamplification card 630 is electrically coupled to magnetic tape head 104 and other electrically driven components by parallel latching device 636. Parallel latching device 636 is fully described in a commonly-owned U.S. Pat. No. 5,232,375, to Christian A. Todd, entitled "Parallel Latching Device For Connectors," issued on Aug. 3, 1993, incorporated herein by reference in its entirety. Read/write preamplification card 630 is connected to the tape transport system 600 via electrical connector 638.

FIG. 7 illustrates a top perspective view of a tape transport 700 illustrating the relative position of the major components of the tape transport, including high-performance tape path system 600. FIG. 7 further illustrates the position of tape path system 600 relative to a tape threading arm 706, a supply reel 702 located in a magnetic tape cartridge 708, and a machine or take-up reel 704. When a magnetic tape is inserted into tape transport 700, tape threading mechanism 706 attaches to a leader block of the magnetic tape cartridge and threads the magnetic tape in an arcuate path around high-performance tape path system 600 to take-up reel 704.

The high performance tape path system 600 is further described in commonly owned U.S. utility patent application, title "High Performance Tape Path System" to Herron, et al., Ser. No. 08/170,916, filed on Dec. 21, 1993, herein incorporated by reference in its entirety.

The preferred embodiment of the present invention is configured to support a magnetic read/write head operating with a magnetic tape media storing digital data. However, as would be apparent to one skilled in the relevant art, the present invention may be adapted to operate with other types of record medium, media, and information. For example, an optical read/write head may be used. Also, the record medium may store video or audio data, for example.

While the invention has been particularly shown and described with reference to preferred embodiments thereof, it will be understood by those skilled in the relevant art that various changes in form and detail may be made therein without departing from the spirit and scope of the invention.

What is claimed is:

1. In a system for recording and/or playback of information on a plurality of parallel tracks of a record medium on a media transport path, a read/write head positioning device operable to selectively align the read/write head with respect to each one of the tracks, the read/write head positioning device comprising:

a support base assembly fixedly secured proximate to the media transport path;

a carriage assembly configured to support the read/write head in a plurality of positions adjacent to and transverse to the tracks;

an electromagnetic positioning means for displacing said carriage assembly in a direction transverse to the tracks;

linear slide means, interposed between said support base assembly and said carriage assembly, for displacing said carriage assembly relative to said support base assembly when operated upon by said electromagnetic positioning means, comprising:

a linear slide carriage integral with said carriage assembly, having a first side and a second side substantially parallel with said first side in a direction of travel of said carriage assembly, said linear slide carriage having first and second recesses respectively formed in said first and second sides thereof;

a linear slide base integral with said support base assembly, disposed to straddle said carriage, having third and fourth recesses respectively formed in opposing inner surfaces of skirt portions thereof, said third and fourth recesses of said linear slide base respectively opposed to and aligned with said first and second recesses of said linear slide carriage; and rack and pinion means, interposed between said linear slide base and said linear slide carriage, for enabling a controlled movement of said carriage assembly relative to said support base assembly.

2. The read/write head positioning device of claim 1, wherein said linear slide means further comprises:

a plurality of bearing rod pairs having a first and second bearing rod interposed in each of said first, second, third, and fourth recesses, each of said bearing rod pairs forming a bearing roller surface; and a plurality of ball bearings configured to travel along corresponding bearing roller surfaces of said linear slide carriage and of said linear slide base.

3. The read/write head positioning device of claim 2, wherein said rack and pinion means comprises:

a first rack and pinion assembly interposed between said first side of said linear slide carriage and said skirt portion of said linear slide base; and a second rack and pinion assembly interposed between said second side of said linear slide carriage and said skirt portion of said linear slide base.

4. The read/write head positioning device of claim 3, wherein said first and second rack and pinion assemblies each comprises:

a pair of opposing rack gears, substantially parallel to said first, second, third, and fourth recesses, including a first rack gear extending along said linear slide carriage and a second rack gear extending along said linear slide base, said first and second rack gears having gear teeth on opposing surfaces thereof; and at least one bearing retainer gear communicating with said first and second rack gears and freely securing one of said plurality of ball bearings.

5. The apparatus of claim 4, further comprising:

preload means for securing said plurality of bearing rod pairs in each of said first, second, third, and fourth recesses.

6. The read/write head positioning device of claim 5, wherein said preload means comprises:

a preload plate configured to reside in said first recess of said linear slide base in parallel relationship with said plurality of bearing rod pairs; and securing means, interposed between said preload plate and an inner wall of said skirt portion of said linear slide base, for applying a pressure to said preload plate;

wherein said preload plate evenly distributes said applied pressure along the length of said preload plate.

7. The read/write head positioning device of claim 2, wherein said bearing rod pairs in said first and second recesses of said linear slide carriage are in opposing relationship with said bearing rod pairs in said third and fourth recesses of said linear slide base, wherein said adjacent bearing rods of opposing bearing rod pairs in conjunction form a bearing roller surface.

8. The read/write head positioning device of claim 1, wherein said electromagnetic positioning means is a voice coil, said voice coil having a stationary coil portion and a moving magnet portion thereof, said carriage assembly fixedly coupled to said moving magnet portion of said voice coil.

9. The read/write head positioning device of claim 1, wherein said carriage assembly further comprises a flex cable strain relief, coupled to said carriage assembly, configured to support a flex cable attached to the read/write head when the read/write head is installed in said carriage assembly.

10. The read/write head positioning device of claim 1, wherein said record medium is a magnetic tape medium.

11. The read/write head positioning device of claim 1, wherein said read/write head is an 18 track read/write tape head and further wherein said record medium is a 144 track record medium, and further wherein said electromagnetic positioning means dynamically displaces said carriage assembly in a direction transverse to said tracks to thereby place said read/write head adjacent to said tracks of said record medium.

12. In a system for recording and/or playback of information on a plurality of parallel tracks of a record medium on a media transport path, a method for constructing a read/write head positioning device comprising the steps of:

(a) mounting the read/write head on a carriage assembly configured to support the read/write head in a plurality of positions adjacent to and transverse to the tracks;

(b) positioning a support base assembly proximate to the media transport path;

(c) coupling said carriage assembly to said support base assembly using electromagnetic positioning means for displacing said carriage assembly in a direction transverse to said tracks;

(d) interposing a linear slide means between said carriage assembly and said support base assembly, wherein said linear slide means displaces said carriage assembly relative to said support base assembly, said linear slide means constructed by:

(i) attaching to said carriage assembly a linear slide carriage having a first side and a second side substantially parallel with said first side in the direction of travel of said carriage assembly, said linear slide carriage having first and second recesses respectively formed in the surfaces of, and parallel to, said first and second sides thereof;

(ii) attaching to said support base assembly a linear slide base, disposed to straddle said carriage, having third and fourth recesses respectively formed in opposing inner surfaces of skirt portions thereof, said third and fourth recesses of said linear slide base respectively opposed to and aligned with said first and second recesses of said linear slide carriage;

(iii) interposing, between said linear slide base and said linear slide carriage, rack and pinion means for enabling the controlled movement of said carriage assembly relative to said support base assembly.

13. The method of claim 12, wherein step (d) further comprises the following steps:

(iv) disposing a pair of bearing rods having a first and second bearing rod in each of said recesses, each of said bearing rod pairs forming a bearing roller surface; and (v) disposing, between corresponding bearing roller surfaces of said linear slide carriage and of said linear slide base, a plurality of ball bearings configured to travel along said corresponding bearing roller surfaces.

14. The method of claim 13, wherein step (v) comprises the steps of:

(1) interposing a first rack and pinion assembly between said first side of said linear slide carriage and said corresponding skirt portion of said linear slide base; and (2) interposing a second rack and pinion assembly between said second side of said linear slide carriage and said corresponding skirt portion of said linear slide base.

15. The read/write head positioning device of claim 14, wherein said first and second rack and pinion assemblies are constructed by a method comprising the steps of:
   (a) disposing a pair of opposing rack gears substantially parallel to said recesses, comprising the steps of:
      (i) disposing a first rack gear along said linear slide carriage; and
      (ii) disposing a second rack gear along said linear slide base, said first and second rack gears having gear teeth on opposing surfaces thereof; and
   (b) disposing, between said opposing rack gears, at least one bearing retainer gear simultaneously communicating with said first and second rack gears and freely securing one of said plurality of ball bearings.

16. The method of claim 15, further comprising the step of securing said bearing rod pairs in each of said respective recesses using preload means.

17. The method of claim 16, further comprising the steps of:
   (a) disposing a preload plate in said first recess of said linear slide base in parallel relationship with said bearing rod pairs; and
   (b) interposing, between said preload plate and an inner wall of said skirt portion of said linear slide base, securing means for applying a pressure to said preload plate, such that said preload plate evenly distributes said applied pressure along the length of said preload plate.

18. The method of claim 13, wherein said bearing rod pairs in said recesses of said linear slide carriage are in opposing relationship with said bearing rod pairs in said corresponding recesses of said linear slide base, wherein said adjacent bearing rods of opposing bearing rod pairs in conjunction form a bearing roller surface.

19. The method of claim 12, wherein said electromagnetic positioning means is a voice coil having a stationary coil portion and a moving magnet portion thereof, said carriage assembly fixedly coupled to said moving magnet portion of said voice coil.

20. The method of claim 12, further comprising the step of coupling a flex cable strain relief to said linear slide carriage, said flex cable strain relief configured to support a flex cable attached to the read/write head when the read/write head is installed in said linear slide carriage.

* * * * *